(12) United States Patent
Miller (10) Patent No.: US 8,036,312 B2
(45) Date of Patent: Oct. 11, 2011

(54) SYSTEM AND METHOD FOR DETERMINING SIGNAL PHASE

(75) Inventor: Timothy R. Miller, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1197 days.

(21) Appl. No.: 11/730,258

(22) Filed: Mar. 30, 2007

(65) Prior Publication Data

US 2008/0240292 A1   Oct. 2, 2008

(51) Int. Cl.
*H03K 9/00*   (2006.01)
(52) U.S. Cl. ......................................................... 375/316
(58) Field of Classification Search .................. 375/316, 375/324, 346
See application file for complete search history.

(56) References Cited

U.S. PATENT DOCUMENTS

| | | | |
|---|---|---|---|
| 5,285,472 A | | 2/1994 | Leonard et al. |
| 5,764,687 A * | | 6/1998 | Easton ........................... 375/147 |
| 6,366,225 B1 | | 4/2002 | Ozdemir |
| 6,775,084 B1 | | 8/2004 | Ozdemir et al. |
| 7,760,139 B1 * | | 7/2010 | Gorski-Popiel .......... 342/357.36 |
| 2002/0003492 A1 | | 1/2002 | Syrjarinne et al. |
| 2002/0031192 A1 * | | 3/2002 | Zou et al. ....................... 375/325 |
| 2002/0110184 A1 * | | 8/2002 | Akopian et al. ............... 375/149 |
| 2004/0052305 A1 * | | 3/2004 | Olson et al. .................... 375/148 |
| 2005/0018750 A1 * | | 1/2005 | Foerster et al. ................ 375/130 |
| 2006/0171491 A1 * | | 8/2006 | Tapaninen et al. ............. 375/343 |
| 2007/0013583 A1 * | | 1/2007 | Wang et al. ............... 342/357.15 |
| 2007/0025476 A1 * | | 2/2007 | Rasmussen et al. ........... 375/343 |
| 2007/0030884 A1 * | | 2/2007 | Miller et al. ................... 375/137 |
| 2008/0013604 A1 * | | 1/2008 | Chen ............................. 375/149 |
| 2008/0292004 A1 * | | 11/2008 | Markman et al. ......... 375/240.28 |

OTHER PUBLICATIONS

International Search Report and Written Opinion for correlating PCT Patent Application No. PCT/US2008/057597 dated Jul. 22, 2008.

* cited by examiner

*Primary Examiner* — Chieh M Fan
*Assistant Examiner* — Jaison Joseph (57) ABSTRACT

A receiver circuit (200) is provided, comprising: an agile clock (250) configured to generate an agile clock signal having a controllable agile clock phase based on agile clock control signals; a code processor (260) configured to receive an incoming signal and the agile clock signal, and to generate an on-time signal (110) and an error signal (120) corresponding to the incoming signal; a coarse acquisition circuit (270, 310) configured to identify a coarse acquisition phase based on a total power of the on-time signal and plus a total power of the error signal; a fine acquisition circuit (270, 320) configured to identify a fine acquisition phase based on the coarse acquisition phase and a magnitude of the on-time signal; and an acquisition controller (270, 330) configured to control operation of the coarse acquisition circuit and the fine acquisition circuit, and to provide a final acquisition phase as a current phase based on the one or more fine acquisition phases.

7 Claims, 8 Drawing Sheets

SYSTEM AND METHOD FOR DETERMINING SIGNAL PHASE

FIELD OF THE INVENTION

The present invention relates in general to a system and method for receiving a signal and determining the phase of the incoming signal.

BACKGROUND OF THE INVENTION

In digital data or communications networks, information sent over a transmission medium is encoded into bits. In a simple embodiment each bit could be represented by a wavelet chosen from a set of two unique signal waveforms that represent a digital "1" and a digital "0." For example, a wavelet could be a bi-phase Gaussian pulse that could be sent in an inverted or non-inverted orientation to represent the digital "1" and "0." The wavelet could also be a set number of repeated sinusoids that can likewise be sent in an inverted or non-inverted orientation to represent the "1" and "0." Other wavelet shapes are, of course, possible.

In other embodiments, bits can be represented by codes (also called codewords or chips) that are made up of multiple wavelets in a known pattern, with one pattern representing the digital "1" and another pattern representing the digital "0." Other embodiments can include multiple layers or coding with each code being made up of a plurality of elements of the next lower code.

In order to properly receive the information sent over the transmission medium, a receiving device will typically correlate the incoming chips with locally-generated chips and use the resulting correlation value to determine whether a digital "1" or a digital "0" was sent. However, for this to be done accurately, the chips generated at the receiver device should have the same phase and frequency as the chips in the signal received from the transmitting device.

But in many systems, the transmitting device and the receiving device operate independently from each other, meaning that their local clocks are not necessarily synchronized in phase. Thus, any wavelets or chips they generate are likewise not necessarily synchronized in phase. As a result, the receiving device will typically perform a synchronization process (also called a clock recovery process or an acquisition process) to match the phase and frequency of its local clock with the transmitter clock used to generate the received signal.

One way to accomplish this acquisition process is to have the transmitting device send a known string of chips (i.e., an acquisition code) at the beginning of each set of data that it transmits (e.g., at the beginning of a data packet). The acquisition code can be repeated multiple times (e.g., in a preamble) to allow the receiver device sufficient time to properly match its local clock phase with the clock phase of the transmitting device that sent the incoming signal (i.e., to successfully acquire the incoming signal).

During an acquisition process, the receiving device correlates a locally-generated copy of the acquisition code with a received copy of the acquisition code in a sliding correlator. The sliding correlator operates by mixing (i.e., multiplying) the locally-generated code sequence with the received signal, integrating the result over the duration of the known code, and collecting a string of integration values.

If the phase of the clock used at the transmitter to encode the data matches the receiver clock phase, then a maximum correlation value will be produced when the two sequences (i.e. the locally-generated sequence and the received sequence) are mixed at the receiver. If the phases differ, however, the result will be below that maximum value. The sliding correlator can vary the phase of the local clock it uses to generate a local copy of the acquisition code, thereby causing the local acquisition code to "slide" in phase (i.e., time) relative to the received acquisition code. At some point during this phase sliding process, the string of correlation values will peak to the largest absolute value, indicating that the two sequences are phase (i.e., time) aligned. Were they allowed to continue to slide in phase, a repeating pattern would result that can be called the cyclic autocorrelation function of the acquisition code.

Because the output of the sliding correlator is cyclic, the process of moving the phase of the receiver relative to the transmitter through one cycle of the acquisition code is often referred to as a "code wheel spin." To guarantee that the largest absolute value of the correlation function is obtained, the code wheel must be allowed to spin at least one full cycle during the acquisition process. However, given minimum phase step sizes and signal-to-noise (SNR) requirements, this can cause acquisition to be a time consuming process.

It is therefore desirable to provide a system and method that can allow for a quicker acquisition process.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

On-Time and Error Signals

Figure 1:
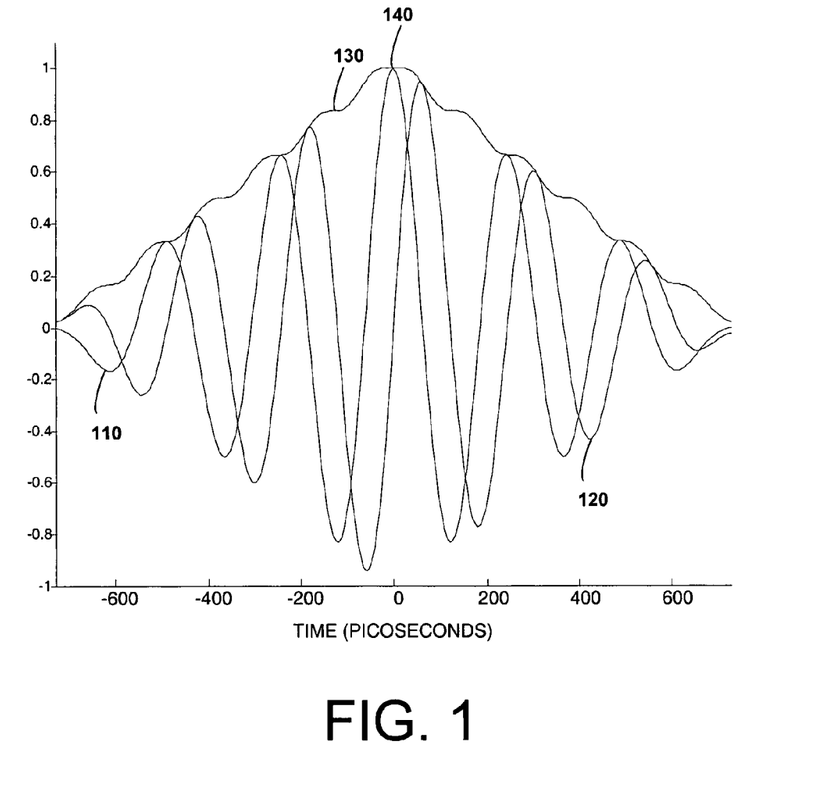
FIG. 1 is a graph of an on-time signal, an error signal, and an envelope function for an incoming signal according to disclosed embodiments of the present invention.

FIG. 1 is a graph of an on-time signal, an error signal, and an envelope function for an incoming signal according to disclosed embodiments of the present invention.

As shown in FIG. 1, the on-time signal 110 represents a correlation result between a known portion of the incoming signal received by a receiving device and a copy of the known portion of the incoming signal generated locally at the receiver device (i.e., it is the cyclic autocorrelation function). During acquisition, the known portion can be an acquisition code. In one particular embodiment, the known portion is an acquisition code having twenty-four chips, although this can be varied for alternate embodiments.

The magnitude of the on-time signal 110 will rise and fall depending upon the phase difference between the received signal and the locally-generated signal, rising to a maximum when the two are exactly in phase with each other. Local peaks and valleys in the on-time signal 110 represent an alignment of individual wavelets or chips, but not the entire acquisition code. The maximum peak 140 in the on-time signal 110 represents a full alignment of the acquisition code.

The error signal 120 indicates how far any point in the on-time signal 110 is from a local peak (or valley). In this embodiment, the error signal 120 indicates the slope of the on-time signal 110. IT will have a value of 0 at any peak or valley in the on-time signal 110, and a positive or negative value as the on-time signal 110 moves away from a peak or valley.

Because the on-time signal 110 and the error signal 120 are separated by ninety degrees of phase, they can be referred to as in-phase and quadrature-phase signals (I and Q), respectively.

Furthermore, the on-time signal 110 and the error signal 120 can also be considered to pass within an envelope 130. This envelope 130 rises and falls with the local peaks in the on-time signal 110 and the error signal 120, and reaches its maximum at the maximum peak of the on-time signal 110. The envelope 130 is not an actual signal used to encode transmitted data, but merely a measure of a function derived from these signals used for transmission. The envelope 130 is computed by adding the square of the on-time signal 110 and the square of error signal 120. However, the shape of the envelope 130 can be approximated by adding the absolute value of the on-time signal 110 and the absolute value of error signal 120.

As noted above, the process of acquisition involves varying the phase of a locally-generated signal until its phase matches the phase of the incoming signal as closely as possible. In some devices this can be performed by stepping through the code wheel and periodically examining the on-time signal 110 to look for the maximum peak 140.

However, it is also possible to look for the maximum peak 140 by examining the envelope function 130 (or an approximation of the envelope function 130). And since the envelope function 130 has only a single peak 140, this process can be performed with a larger step size and lower SNR (as compared to examining the on-time signal 110) without sacrificing much accuracy. Because the envelope 130 has only a single peak, the largest detected value in the envelope 130 (i.e., the largest value in the signal approximating the envelope 130 or the approximation of the envelope 130) will be the point closest to the actual peak 140, regardless of the step size used.

In contrast, because the on-time (I) signal 110 has multiple peaks and valleys, any operation that looks for the maximum peak 140 on the on-time (I) signal 110 must have a relatively small step size to make certain that the resulting data will meaningfully differentiate between local peaks and the maximum peak 140.

The incoming signal being processed in the embodiments of FIG. 1 could be an ultrawide bandwidth signal, a wideband signal, or any wireless or wired signal that uses wavelets and/or chipping codes.

Receiver Circuit

Figure 2:
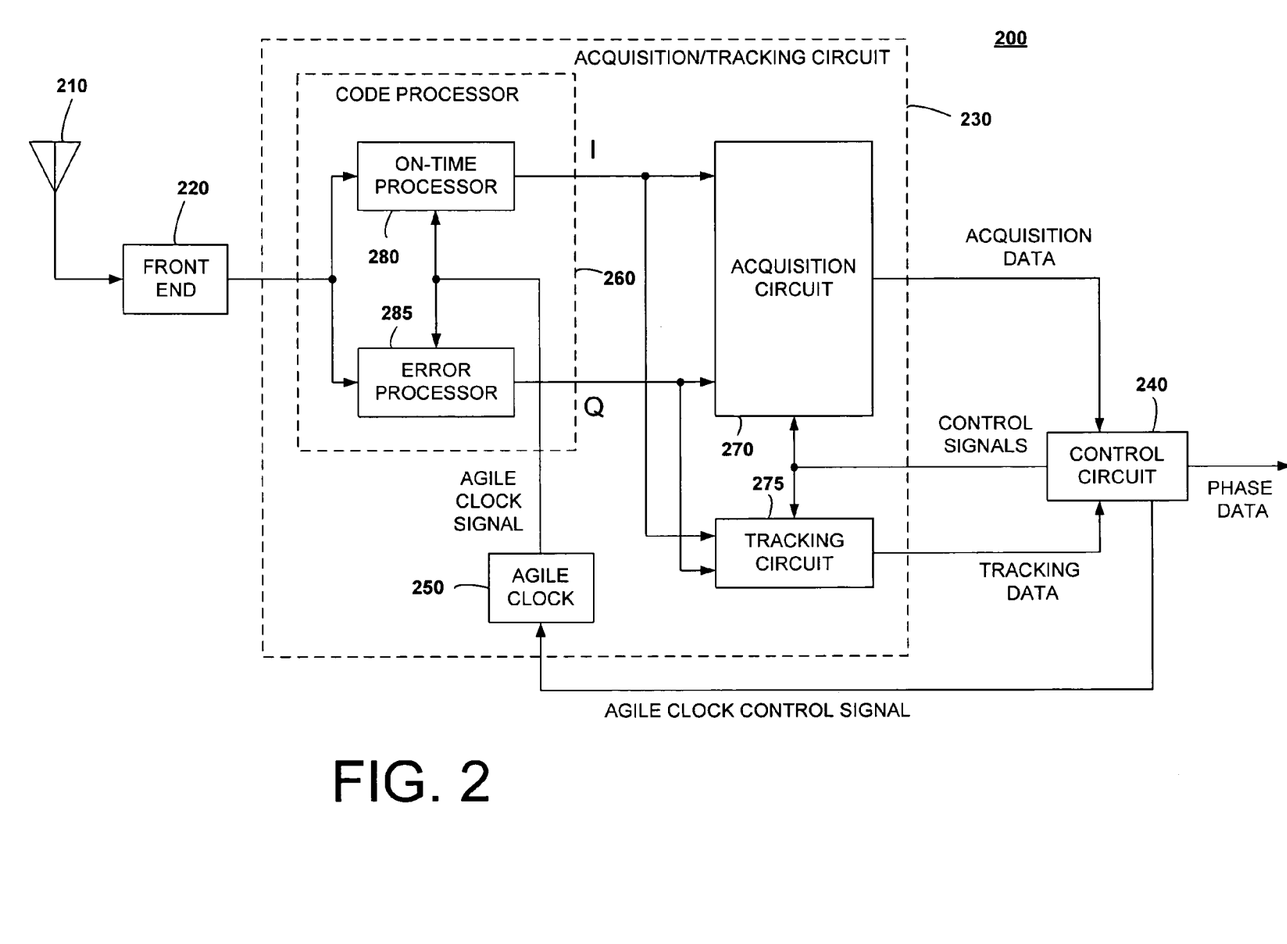
FIG. 2 is a block diagram of a receiver circuit according to disclosed embodiments of the present invention.

FIG. 2 is a block diagram of a receiver circuit according to disclosed embodiments of the present invention. As shown in FIG. 2, the receiver circuit 200 includes an antenna 210, a front end circuit 220, an acquisition/tracking circuit 230, and a control circuit 240. The acquisition/tracking circuit 230 further includes an agile clock 250, a code processor 260, an acquisition circuit 270, and a tracking circuit 275. The code processor further includes an on-time processor 280 and an error processor 285.

The antenna 210 receives the incoming signal over a wireless transmission medium and converts it to a wired signal. In alternate embodiments in which a wired transmission medium is used, this can be eliminated or replaced with any circuitry necessary for connecting to the transmission medium used.

The front end circuit 220 performs a variety of front end operations such as automatic gain control, filtering, and the like, as would be known to one skilled in the art. It may be omitted in some embodiments.

The acquisition/tracking circuit 230 receives the incoming signal from the front end and provides acquisition and tracking data to the control circuit 240 based on control signals it receives from the control circuit 240. Acquisition data includes an estimation of the phase of the incoming signal (i.e., how the phase of the agile clock 250 should be altered to synchronize properly with the incoming signal); the tracking data includes information on how to maintain synchronization between the incoming signal and the agile clock 250 after acquisition is completed.

The agile clock 250 in the acquisition/tracking circuit 230 provides an agile clock signal to the code processor 260. The phase of the agile clock signal can be varied by the agile clock control signal received from the control circuit 240.

The code processor 260 receives the incoming signal from the front end 220 and processes it to generate an on-time signal and an error signal, which can also be referred to as an in-phase (I) signal, and a quadrature-phase (Q) signal, respectively. The on-time (I) signal 110 provides a result of a correlation between the incoming signal and a locally-generated signal generated based on the agile clock signal. The error signal (Q) 120 provides an indication of how close the phase of the agile clock is to the phase of the incoming signal.

In particular, the on-time processor 280 in the code processor 260 takes the incoming signal and generates the on-time (I) signal 110, while the error processor 285 takes the incoming signal and generates the error (Q) signal 120. The specific design and operation of these circuits would be understood by one skilled in the art.

The acquisition circuit 270 takes the on-time (I) and error (Q) signals 110 and 120 and uses these to generate the acquisition data (i.e., the information used to initially synchronize the phase of the agile clock with that of the incoming signal), in response to control signals from the control circuit 240. Similarly, the tracking circuit 275 takes the on-time (I) and error (Q) signals 110 and 120 and uses these to generate the tracking data (i.e., the information used to maintain the synchronization of the phase of the agile clock with that of the incoming signal), also in response to control signals from the control circuit. 240

As noted above, the control circuit 240 provides the agile clock control signal to control the phase of the agile clock 250 based on the acquisition and tracking data received from the acquisition/tracking circuit 230, and provides the control signals to control operation of the acquisition/tracking circuit 230. In some embodiments it may also provide phase data to other portions of the receiver.

Figure 3:
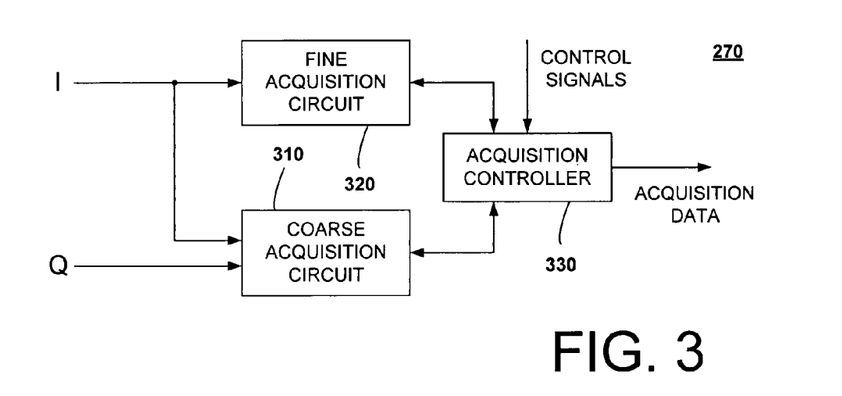
FIG. 3 is a block diagram of the acquisition circuit of FIG. 2 according to disclosed embodiments of the present invention.

FIG. 3 is a block diagram of the acquisition circuit of FIG. 2 according to disclosed embodiments of the present invention. As shown in FIG. 3, the acquisition circuit 270 includes a coarse acquisition circuit 310, a fine acquisition circuit 320, and an acquisition controller 330.

The coarse acquisition circuit 310 receives the on-time (I) signal 110 and the error (Q) signal 120 and uses these to perform a coarse acquisition operation to generate a coarse phase estimate for the incoming signal. It does this in general by examining the values of the envelope function 130 of the I and Q signals, rather than the values of the I and Q signals 110 and 120 themselves. This operation is generally performed over the entire code wheel, and may use relatively large phase step sizes compared to fine acquisition.

The fine acquisition circuit 320 receives the on-time (I) signal 110 and uses it to perform a fine acquisition operation to generate a fine phase estimate for the incoming signal. In general it uses the coarse acquisition phase as a starting point, and examines the values of the on-time (I) signal 110 in the phases surrounding the coarse acquisition phase. Because the fine acquisition circuit 320 can focus it's analysis on a smaller portion of the code wheel, it can use smaller phase step sizes as compared to the coarse acquisition circuit 310, allowing for a more accurate phase estimate.

The acquisition controller 330 receives control signals from the control circuit 240, a coarse acquisition phase from the coarse acquisition circuit 310, and a fine acquisition phase form the fine acquisition circuit 320. Based on this information, it provides further control signals to the coarse acquisition circuit 310 and the fine acquisition circuit 320, and acquisition data to the control circuit 240. The acquisition data can be the coarse acquisition data after a coarse acquisition process and the fine acquisition data after a fine acquisition process, or just the fine acquisition data after a fine acquisition process.

Figure 4:
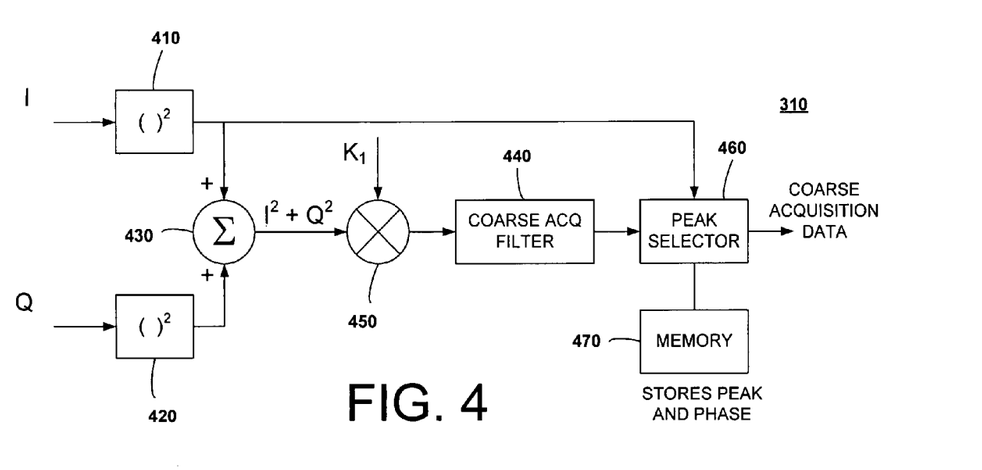
FIG. 4 is a block diagram of the coarse acquisition circuit of FIG. 3 according to disclosed embodiments of the present invention.

FIG. 4 is a block diagram of the coarse acquisition circuit of FIG. 3 according to disclosed embodiments of the present invention. As shown in FIG. 4, the coarse acquisition circuit 310 includes an in-phase squaring circuit 410, a quadrature-phase squaring circuit 420, a summer 430, a coarse acquisition filter 440, a scaler 450, a peak selector 460, and a memory 470.

The in-phase squaring circuit 410 generates a signal that corresponds to the squared value of the in-phase (I) signal 110, while the quadrature-phase squaring circuit 420 generates a signal that corresponds to the squared value of the quadrature phase (Q) signal 120. These signals represent the total power of the in-phase (I) signal 110 and the quadrature phase (Q) signal 120, respectively.

In some embodiments the in-phase squaring circuit 410 and the quadrature-phase squaring circuit 420 can be actual squaring circuits. In other embodiments the in-phase squaring circuit 410 and the quadrature-phase squaring circuit 420 can be replaced with absolute value circuits. This allows these two circuits to generate signals whose general shape (at least with respect to signal peaks) is the same as squared signals. This also allows a receiver to use relatively simple absolute value circuitry. Alternate embodiments can use any suitable function that generates a signal having the same general shape as the square value of the in-phase (I) signal 110 and the quadrature-phase (Q) signal 120 and that produces a shape similar to the envelop of the signal when the in-phase (I) and quadrature-phase (Q) signals are summed.

The summer 430 adds the signals output from the in-phase squaring circuit 410 and the quadrature-phase squaring circuit 420 to generate a total power signal indicative of the total power of the I and Q signals (i.e., a signal corresponding to the envelope function 130 of the I and Q signals 110 and 120). If squares of the I and Q signals 110 and 120 are used, this total power signal will be equivalent to the envelope function 130 reflecting total signal power; if absolute values of the I and Q signals 110 and 120 are used, the resulting summation approximates the shape of the envelop function 130. In either case, the position of the peak value 140 for the total power signal will remain at the same time/phase.

The scaler 450 multiplies the total power signal by a coarse scaling factor K1. In alternate embodiments the scaler 450 can be omitted.

The coarse acquisition filter 440 is a filter that is matched to the envelope response. In one particular embodiment it is a two-pole infinite impulse response filter, though this could be modified in alternate embodiments. In some embodiments the coarse acquisition filter 440 can even be omitted altogether.

The peak selector 460 takes the total power signal (filtered and scaled, as necessary), and monitors it to find a peak value. It then stores any peak values in the memory 470, along with the agile clock phase associated with each stored peak. The peak selector will then select the coarse acquisition phase to be the agile clock phase associated with the largest peak of the total power signal.

At an appropriate time the peak selector will output coarse acquisition data that will include the coarse acquisition phase. This can be done at the end of the coarse acquisition operation, continually throughout the coarse acquisition operation, or however else would be desirable.

The memory 470 can be any suitable memory element such as a random access memory, a flash memory, a set of registers, etc.

Figure 5:
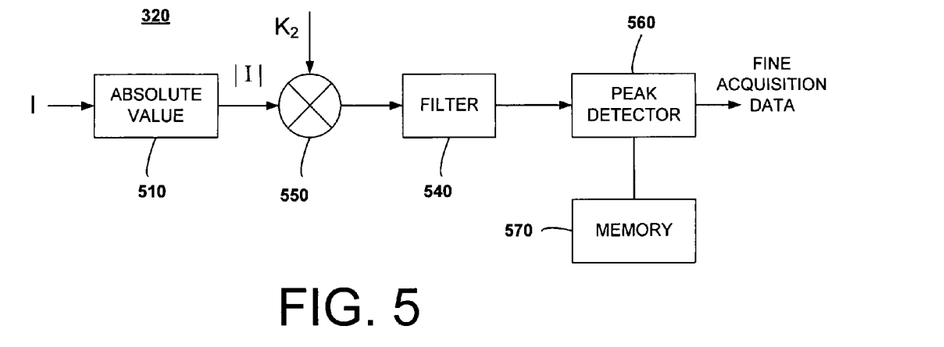
FIG. 5 is a block diagram of the fine acquisition circuit of FIG. 3 according to disclosed embodiments of the present invention.

FIG. 5 is a block diagram of the fine acquisition circuit of FIG. 3 according to disclosed embodiments of the present invention. As shown in FIG. 5, the fine acquisition circuit includes a fine acquisition filter 540, an absolute value circuit 510, a scaler 550, a peak detector 560, and a memory 570.

The absolute value circuit 510 generates an absolute power signal that corresponds to an absolute value of the in-phase (I) signal 110 (i.e., the total power of the in-phase (I) signal 110). This absolute power signal represents the absolute power of the in-phase (I) signal 110.

In some embodiments the absolute value circuit 510 can be an actual absolute value circuit that generates a signal equivalent to the absolute value of the in-phase (I) signal 110. In other embodiments the absolute value circuit 510 can be a squaring circuit that generates a signal equivalent to the square of the absolute value of the in-phase (I) signal 110. Other embodiments can use any suitable function that generates a signal having the same general shape as the absolute value of the in-phase (I) signal 110.

The scaler 550 multiplies the absolute value signal by a coarse scaling factor K2. In alternate embodiments the scaler 550 can be omitted.

The fine acquisition filter 540 is a filter that is matched to the on-time signal. In one particular embodiment it is a two-pole infinite impulse response filter, though this could be modified in alternate embodiments. In some embodiments the fine acquisition filter 540 can even be omitted altogether.

The peak selector 560 takes the absolute value signal (filtered and scaled, as necessary), and monitors it to find a peak value. It then stores any peak values in the memory 570, along with the agile clock phase associated with each stored peak. The peak selector will select the fine acquisition phase to be the agile clock phase associated with the largest peak of the absolute power signal.

At an appropriate time the peak selector will output fine acquisition data that will include the fine acquisition phase. This can be done at the end of the fine acquisition operation, continually throughout the fine acquisition operation, or however else would be desirable.

The memory 570 can be any suitable memory element such as a random access memory, a flash memory, a set of registers, etc.

Figure 6:
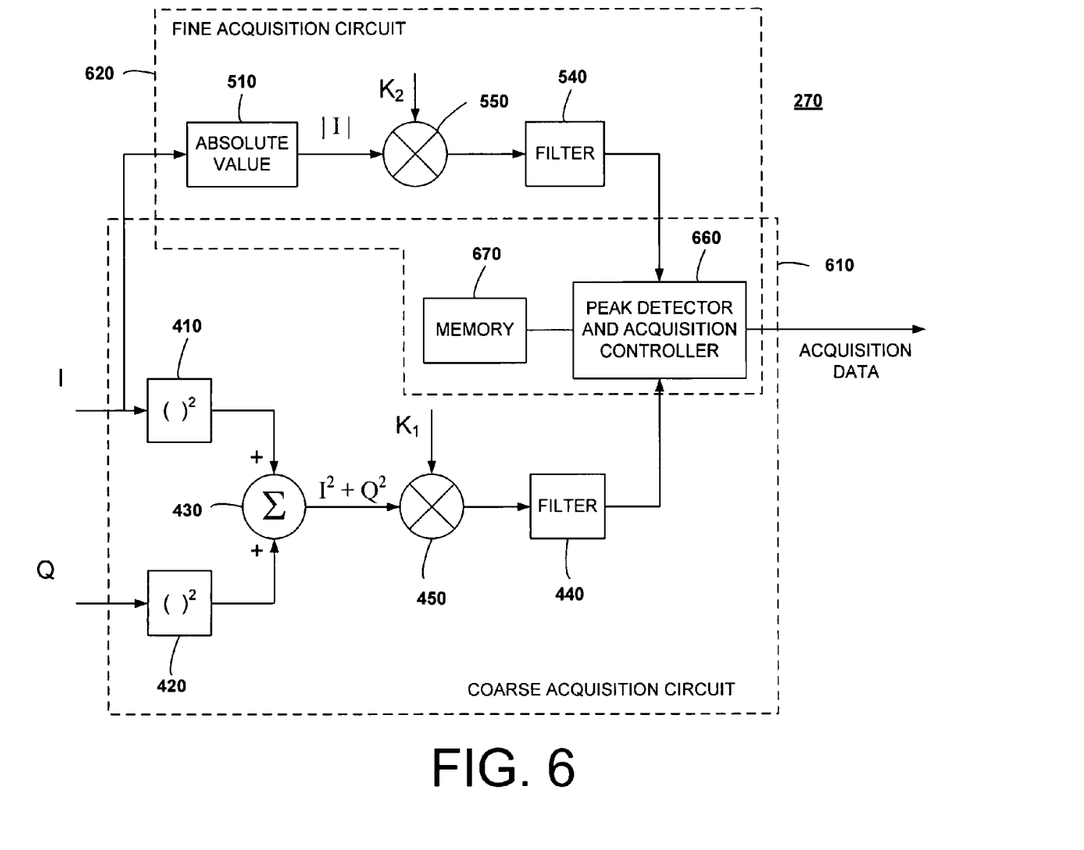
FIG. 6 is a block diagram of the acquisition circuit of FIG. 2 according to disclosed embodiments of the present invention.

FIG. 6 is a block diagram of the acquisition circuit of FIG. 2 according to disclosed embodiments of the present invention. As shown in FIG. 6, the acquisition circuit 270 includes a coarse acquisition circuit 610 and a fine acquisition circuit 620. The coarse acquisition circuit 610 includes an in-phase squaring circuit 410, a quadrature-phase squaring circuit 420, a summer 430, a coarse acquisition filter 440, a scaler 450, a peak selector 660, and a memory 670. The fine acquisition circuit 620 includes an absolute value circuit 510, a fine acquisition filter 540, a scaler 550, the peak selector and acquisition controller 660, and the memory 670.

The squaring circuit 410, absolute value circuit 510, quadrature-phase squaring circuit 420, summer 430, coarse acquisition filter 440, fine acquisition filter 540, scaler 450, and scaler 550 operate as their counterpart elements in FIGS. 4 and 5.

The peak selector and acquisition controller 660 and the memory 670 operate as the peak selector 460 and the memory 470 in FIG. 4, and the peak selector 560 and the memory 570 of FIG. 5, except a single element serves both functions, outputting coarse or fine acquisition data. In addition, the peak selector and acquisition controller 660 performs the functions of the acquisition controller 330 of FIG. 3.

In particular, a receiver circuit is provided, comprising: an agile clock configured to generate an agile clock signal having a controllable agile clock phase based on agile clock control signals; a code processor configured to receive an incoming signal and the agile clock signal, and to generate an on-time signal and an error signal corresponding to the incoming signal; a coarse acquisition circuit configured to identify a coarse acquisition phase based on a total power of the on-time signal and plus a total power of the error signal; a fine acquisition circuit configured to identify a fine acquisition phase based on the coarse acquisition phase and the absolute value of the on-time signal; and an acquisition controller configured to control operation of the coarse acquisition circuit and the fine acquisition circuit, and to provide a final acquisition phase as a current phase based on the one or more fine acquisition phases.

The receiver circuit may further comprise a tracking circuit configured to repeatedly update the current phase based on the on-time signal and the error signal.

The coarse acquisition circuit may comprise: an on-time signal squaring circuit configured to generate a signal corresponding to the square of the on-time signal as a squared on-time signal; an error signal squaring circuit configured to generate a signal corresponding to the square of the error signal as a squared error signal; a summer configured to add the squared on-time signal and the squared error signal to generate a total power signal; and a coarse peak detector for identifying one or more coarse signal peaks in the total power signal and one or more corresponding coarse agile clock phases, wherein the corresponding coarse agile clock phase associated with a maximum of the one or more coarse signal peaks is provided as the coarse acquisition phase. The receiver circuit may further comprise a memory element for storing the one or more coarse signal peaks and the corresponding coarse agile clock phases.

The on-time signal squaring circuit may be an on-time signal absolute value circuit configured to compute the absolute value of the on-time signal to generate an absolute value on-time signal as the squared on-time signal, and the error signal squaring circuit may be an error signal absolute value circuit configured to compute the absolute value of the error signal to generate an absolute value error signal as the squared error signal.

The coarse acquisition circuit may further comprise a coarse acquisition filter for filtering the total power signal to generate a filtered coarse signal, and the coarse peak detector may identify one or more coarse signal peaks in the filtered coarse signal.

The coarse acquisition circuit may further comprise a scaling circuit configured to scale the total power signal by a coarse scaling factor before it is sent to the coarse acquisition filter.

The fine acquisition circuit may comprise: a fine absolute value circuit configured to determine an absolute value of the on-time signal to generate an absolute value signal; and a fine peak detector for identifying one or more fine signal peaks in the absolute value signal and one or more corresponding fine agile clock phases, wherein the corresponding fine agile clock phase associated with a maximum of the one or more fine signal peaks is provided as the fine acquisition phase.

The fine absolute value circuit may be a fine squaring circuit configured to square the on-time signal to generate a squared on-time signal as the absolute power signal.

The fine acquisition circuit may further comprise a fine acquisition filter for filtering the absolute value of the on-time signal to generate a filtered absolute value fine signal.

The fine acquisition circuit may further comprise a scaling circuit configured to scale the absolute power signal by a fine scaling factor before it is sent to the fine acquisition filter.

The signal acquisition circuit may be implemented in an integrated circuit. And the incoming signal may be an ultra-wide bandwidth signal.

Multiple Finger Receiver

Figure 7:
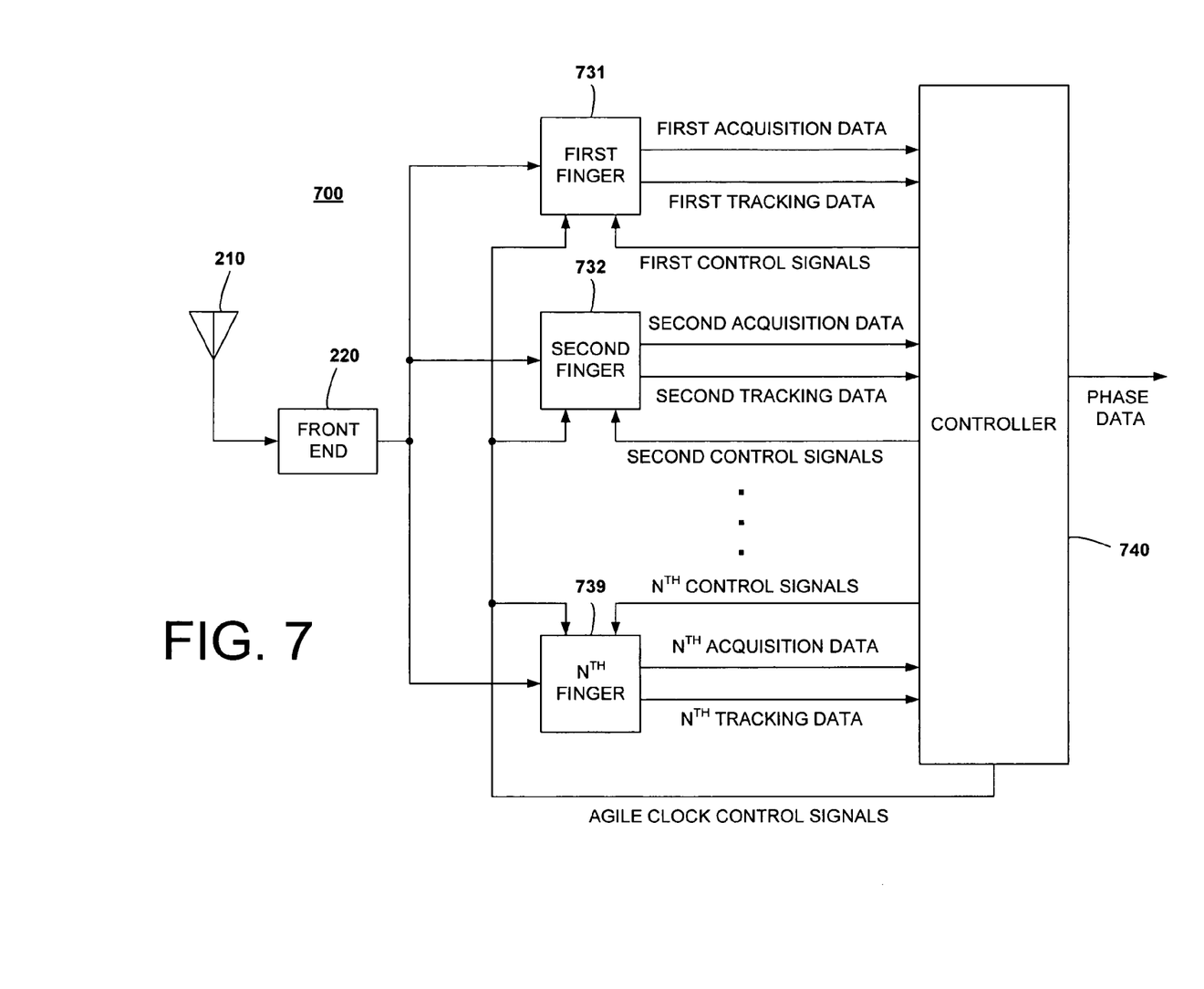
FIG. 7 is a block diagram of a receiver circuit having multiple fingers according to disclosed embodiments of the present invention.

FIG. 7 is a block diagram of a receiver circuit having multiple fingers according to disclosed embodiments of the present invention. As shown in FIG. 7, the receiver circuit 700 includes an antenna 210, a front end circuit 220, N fingers 731, 732, ..., 739, and a controller 740.

The antenna 210 and the front end circuit 220 operate as described above with respect to the receiver of FIG. 2.

The N fingers 731, 732, ..., 739 each function as the acquisition/tracking circuit 230 of FIG. 2.

The controller 740 operates in a manner similar to the controller 240 of FIG. 2. However, it provides separate control signals for each of the N fingers 731, 732, ..., 739, and receives separate acquisition and tracking data from each of the N fingers 731, 732, ..., 739. As a result, the controller can instruct each of the N fingers 731, 732, ..., 739 to operate on a different portion of the code wheel in parallel.

In this way the receiver 700 can process the incoming signal more quickly, since each individual finger need only move its agile clock through a portion of the code wheel. The controller 740 can then take all of the acquisition and tracking data from each of the N fingers 731, 732, ..., 739 and use these to determine phase data for the incoming signal in a manner analogous to that described above with respect to the controller 240 of FIG. 2, except that it obtains multiple sets of information at the same time.

In general receiver circuit is provided, comprising: N receiver fingers configured to receive an incoming signal and provide N acquisition data signals, respectfully; and a controller configured to determine a phase estimate based on the N acquisition data signals and provide N control signals to the N receiver fingers, respectively, wherein each of the N receiver fingers comprises: an agile clock configured to generate an agile clock signal having a controllable agile clock phase based on a respective one of the N control signals, a code processor configured to receive the incoming signal and the agile clock signal, and to generate an on-time signal and an error signal corresponding to the incoming signal, a coarse acquisition circuit configured to identify a coarse acquisition phase based on a total power of the on-time signal and plus a total power of the error signal, a fine acquisition circuit configured to identify a fine acquisition phase based on the coarse acquisition phase and the peak of the on-time signal, and an acquisition controller configured to control operation of the coarse acquisition circuit and the fine acquisition circuit, and to provide a corresponding one of the N acquisition data signals based on the one or more fine acquisition phases, wherein the N control signals instruct the agile clock in each of the N receiver fingers to operate in one of N phase ranges, respectively, each of the N phase ranges being less than an entire code wheel, and wherein the N phase ranges together cover the entire code wheel.

The coarse acquisition circuit in each of the N receiver fingers may further comprise: an on-time signal squaring circuit configured to square the on-time signal to generate a squared on-time signal; an error signal squaring circuit configured to square the error signal to generate a squared error signal; a summer configured to add the squared on-time signal and the squared error signal to generate a total power signal; and a coarse peak detector for identifying one or more coarse signal peaks in the total power signal and one or more corresponding coarse agile clock phases, wherein the corresponding coarse agile clock phase associated with a maximum of the one or more coarse signal peaks is provided as the coarse acquisition phase.

In each of the N receiver fingers, the coarse acquisition circuit may further comprises a coarse acquisition filter for filtering the total power signal to generate a filtered coarse signal, and in each of the N receiver fingers, the coarse peak detector may identify one or more coarse signal peaks in the filtered coarse signal.

The fine acquisition circuit in each of the N receiver fingers may further comprise: an absolute value circuit configured to determine an absolute value of the on-time signal to generate an absolute value signal; and a fine peak detector for identifying one or more fine signal peaks in the absolute value signal and one or more corresponding fine agile clock phases, wherein the corresponding fine agile clock phase associated with a maximum of the one or more fine signal peaks is provided as the fine acquisition phase.

In each of the N receiver fingers, the fine acquisition circuit may further comprise a fine acquisition filter for filtering the absolute value of the on-time signal to generate a filtered absolute fine signal.

Signal Acquisition

Figure 8:
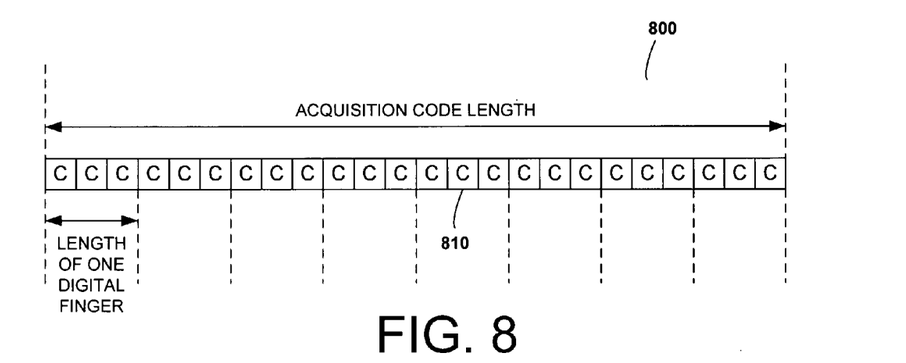
FIG. 8 is a diagram of the processing of an acquisition code using a multiple finger receiver according to disclosed embodiments of the present invention.

FIG. 8 is a diagram of the processing of an acquisition code using a multiple finger receiver according to disclosed embodiments of the present invention. As shown in FIG. 8, an exemplary acquisition code has twenty-four chips 810, with a corresponding code wheel equal to the phase length of the twenty-four chips that make up the acquisition code.

In this exemplary embodiment, eight fingers are used in an acquisition process, with each finger covering $\frac{1}{8}^{th}$ of the code wheel, or the phase length of three chips. This is only by way of example, however. Alternate embodiments could use larger or smaller acquisition codes, and more or fewer fingers. Furthermore, the operation of the fingers need not be equivalent in phase range, nor need their phase ranges be mutually exclusive.

Figure 9:
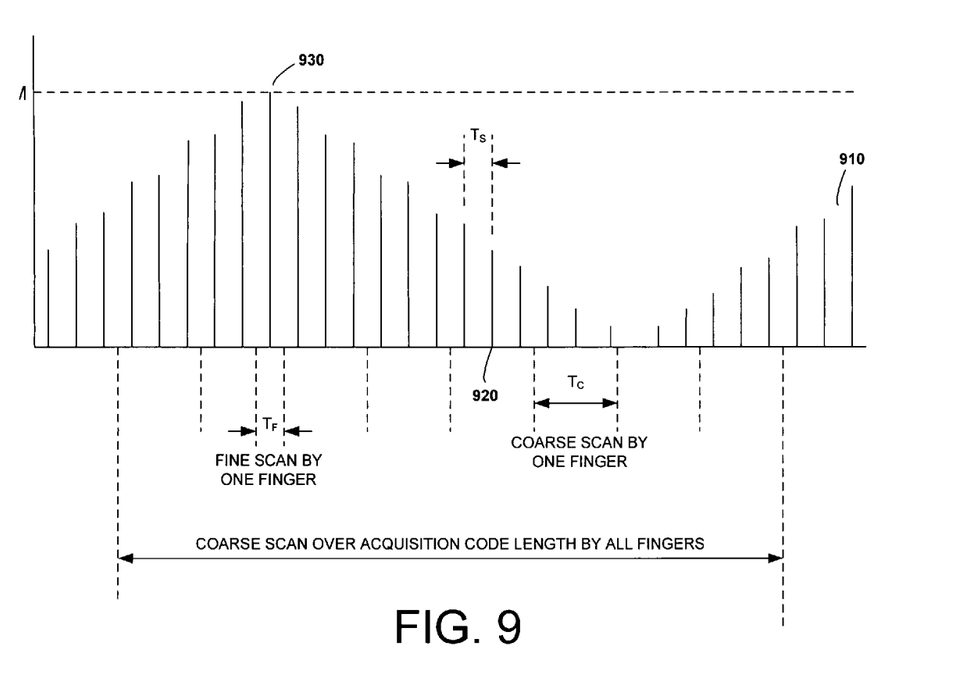
FIG. 9 is a graph of a coarse acquisition operation according to disclosed embodiments of the present invention.

FIG. 9 is a graph of a coarse acquisition scan according to disclosed embodiments of the present invention. As shown in FIG. 9, coarse acquisition is performed by making a coarse scan of the envelope data 910 over an entire code wheel (i.e., through a phase range that covered an entire acquisition code). The scan is performed by taking a plurality of individual samples 920 via the coarse acquisition circuit 310, each separated by a step time $T_S$ (i.e., a step phase), in order to identify a peak sample 930.

In this disclosed embodiment, the code wheel is equal to the phase length of twenty-four chips. Alternate embodiments could vary this, however. Furthermore, in the disclosed embodiment eight fingers are used for coarse acquisition, though this too can be varied in alternate embodiments. Each finger scans over a coarse scan time $T_C$ (i.e., a coarse scan phase range) to take a number of total power (i.e., envelope) samples.

Because coarse acquisition starts at an effectively random time with respect to the incoming signal, there is no guarantee that the process will start at the beginning of the acquisition code, or even at the beginning of a chip. Regardless, the receiver steps through the entire code wheel in steps equal to a coarse phase step. The embodiment disclosed in FIG. 9 shows phase steps of one chip length, meaning there are only three phase steps before each finger during coarse acquisition. One way to accomplish this is through the use of a set of delay elements within each finger that each represents the coarse phase step. However, alternate embodiments can use different methods of implementing the phase steps as well as different phase step sizes.

Given the relatively large coarse phase step size in coarse acquisition, each finger can sweep through its required phase portion relatively quickly. And as shown by the samples taken in FIG. 9, since this process looks at the envelope date (i.e., the total power data), there is only one peak sample 930 (or at most two, if samples were taken at exactly the same side of the actual peak), making it much easier to narrow down the location of that single peak.

Once the coarse acquisition is completed, the receiver can then perform a fine scan over a much smaller fine time period $T_F$ (i.e., a fine scan phase range) proximate to the coarse acquisition phase (or time) identified by the coarse acquisition process.

Figure 10:
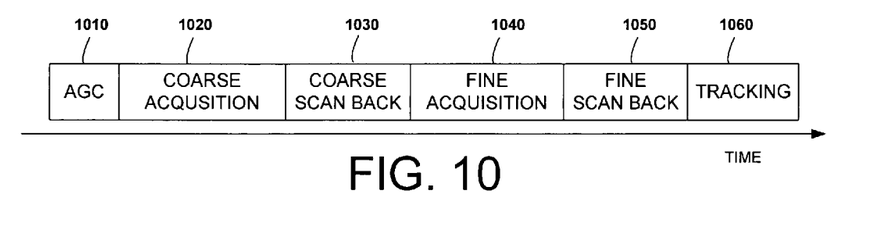
FIG. 10 is a timing block of an acquisition process according to disclosed embodiments of the present invention.

FIG. 10 is a timing block of an acquisition process according to disclosed embodiments of the present invention. As shown in FIG. 10, the acquisition process includes an automatic gain control process 1010, a coarse acquisition process 1020, a coarse scan back process 1030, a fine acquisition process 1040, a fine scan back process 1050, and a tracking process 1060.

In the automatic gain control process 1010, the front end 220 performs an automatic gain processes on the incoming signal to improve signal reception.

In the coarse acquisition process 1020, the coarse acquisition circuit 310 performs a coarse acquisition operation to generate a coarse acquisition phase based on the envelope function 130 derived from the incoming signal.

In the coarse scan back process 1030, the agile clock will step back the coarse acquisition phase to account for processing delay within the receiver, and to allow a fine acquisition operation to be performed for phases both immediately before and immediately after the coarse acquisition phase.

In the fine acquisition process 1040, the fine acquisition circuit 320 performs the fine acquisition operation to generate a fine acquisition phase based on the on-time (I) signal 110 derived from the incoming signal and the scanned back coarse acquisition phase.

In the fine scan back process 1050 the agile clock will step back the fine acquisition phase to account for processing delay within the receiver, thereby providing an operational agile clock phase.

In the tracking process 1060, the tracking circuit 275 will periodically monitor the incoming signal to see if the operational agile clock phase has to be adjusted to keep it properly synchronized with the incoming signal.

Although the embodiments described with respect to FIGS. 8 to 10 are for a signal acquisition using eight fingers, alternate embodiments could use any number of fingers, including a single finger.

Method of Acquiring a Signal

Figure 11:
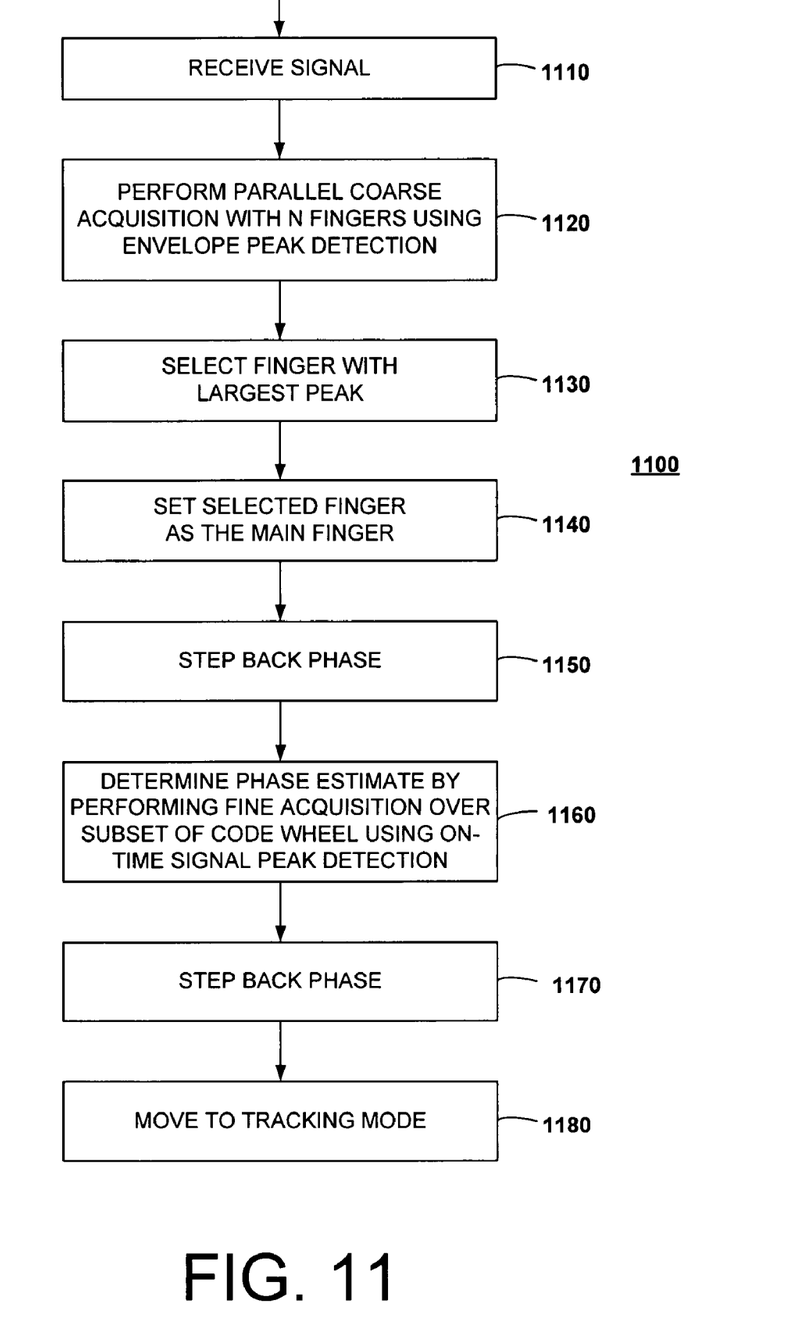
FIG. 11 is a flow chart of a method of operating a receiver to identify a phase of an incoming signal according to disclosed embodiments of the present invention.

FIG. 11 is a flow chart of a method of operating a receiver to identify a phase of an incoming signal according to disclosed embodiments of the present invention. As shown in FIG. 11, processing begins when the receiver receives the signal (1110).

The receiver then performs parallel coarse acquisition with N fingers using envelope peak detection (1120). In one embodiment each finger operates on $1/N^{th}$ of the code wheel, such that the N fingers together check the entire code wheel. In alternate embodiments, however the fingers can operate on overlapping phase ranges, or even all operate on the entire code wheel for redundancy.

Once the coarse acquisition is done, the receiver selects the finger that has identified the largest peak (1140) and steps back the phase of the agile clock in at least one finger by a set amount from the phase associated with the maximum peak (1150). This step back operation performs two functions.

First, it accounts for any processing delays in the receiver that might cause the associated with the peak to be different than the actual phase at which the agile clock was operating when the peak was actually received. Second, it allows the fine acquisition process to operate at phases both before and after the phase of the detected peak.

Once the phase of the agile clock has been stepped back (1150), the receiver determines a fine phase estimate by performing a fine acquisition process in one or more fingers over a subset of the code wheel surrounding the phase associated with the maximum peak using on-time signal peak detection (1160). This fine acquisition process can use a smaller phase step size since the coarse acquisition process will have narrowed down the proper phase value to within a much smaller range.

Once the receiver has determined the fine phase estimate (1160), it steps back the fine phase estimate to account for circuit delays in a fine acquisition circuit. This step back allows the final phase estimate (i.e., the final acquired phase) to more accurately reflect the actual phase of the agile clock when the on-time signal peak was detected.

Finally, the receiver can move into a tracking mode (1170) that will allow it to periodically monitor the acquired phase based on the on-time and error signals to see if any phase adjustments are required to keep the local phase synchronized with the phase of the received signal.

Figure 12:
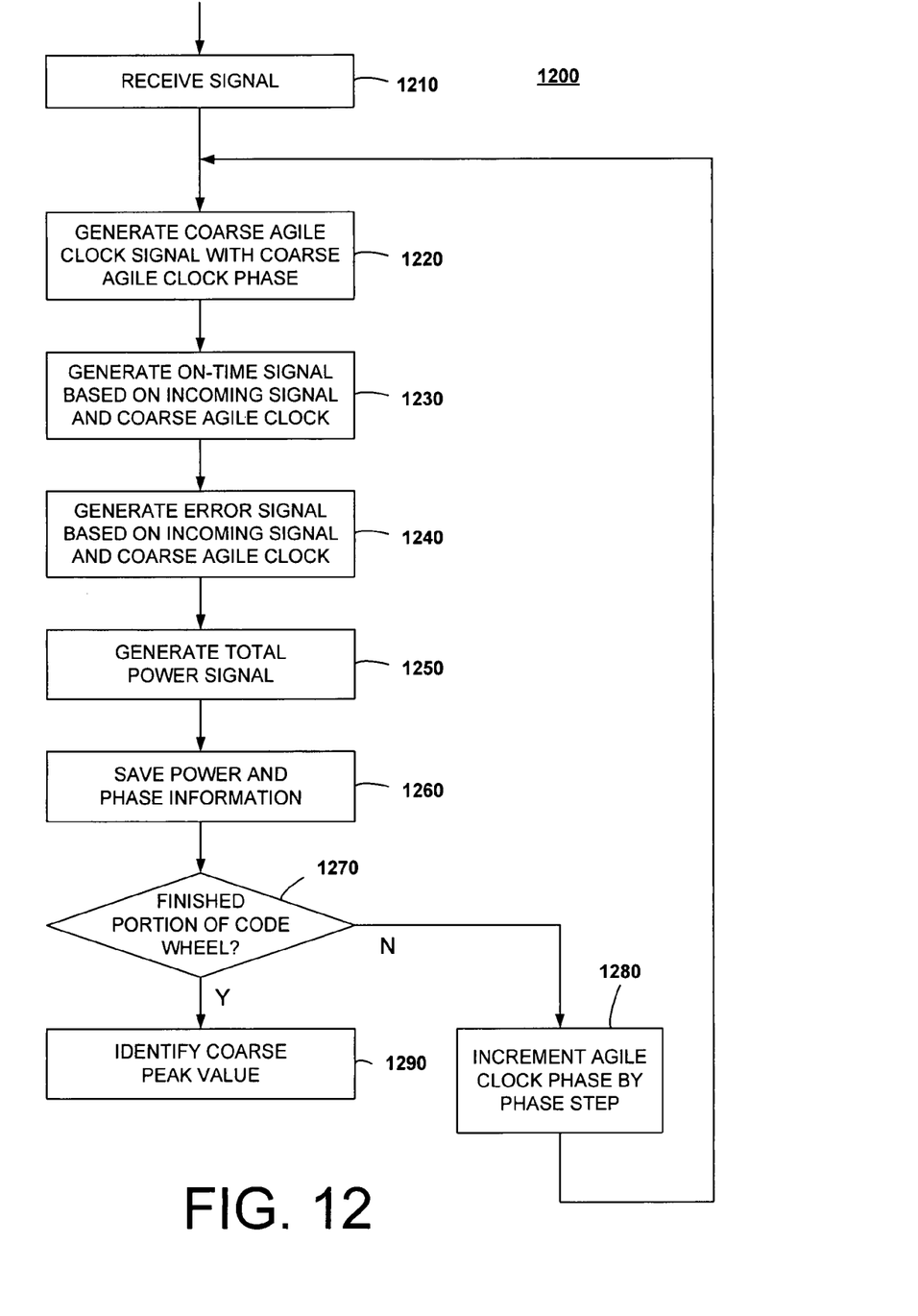
FIG. 12 is a flow chart of a method of performing coarse acquisition to identify a phase of an incoming signal according to disclosed embodiments of the present invention.

FIG. 12 is a flow chart of a method of performing coarse acquisition to identify a phase of an incoming signal according to disclosed embodiments of the present invention. For example, this shows possible embodiments for the coarse acquisition operation 1120 performed by one finger from FIG. 11.

As shown in FIG. 12, the coarse acquisition process 1200 begins when the receiver receives the incoming signal (1210).

The receiver then generates a coarse agile clock signal with a coarse agile clock phase (1220), and uses this agile clock signal along with the incoming signal to generate an on-time signal (1230) and an error signal (1240). This can be done, for example, by using the agile clock signal to generate a local signal that is then correlated with the incoming signal to generate the on-time signal, and determining the slope of the on-time signal to generate the error signal.

The receiver then generates a total power signal based on the on-time signal and the error signal (1250). Once the total power signal is generated by adding the squares of the two signals together. Another way to generate an approximation to the power signal is to add the absolute value of the on-time signal to the absolute value of the error signal. Other alternates may also be used.

Once the total power signal is generated, the receiver then saves the relevant power and phase information (1260). In some embodiments the receiver may save all of the power and phase information during the coarse acquisition. In other embodiments it may only save information relating to the currently-identified maximum peak.

The receiver then determines whether the portion of the code wheel being traversed has been finished or not (1270). In some embodiments the process may traverse the entire code wheel (e.g., if a single finger is used). In others, it may only traverse a limited portion of the code wheel (e.g., if multiple fingers are used).

If the receiver determines that the necessary portion of the code wheel has not been traversed (1270), it increments the agile clock phase by a known phase step and repeats the operations of generating a coarse agile clock signal (1220), generating an on-time signal (1230), generating an error signal (1240), generating a total power signal (1250), saving power and phase information (1260), and determining whether the code wheel has been traversed (1260).

If, however, the receiver determines that the necessary portion of the code wheel has been traversed (1270), it can look to the stored power and phase information to identify a coarse peak value (1290). If multiple pieces of power and phase information have been stored, then the receiver can determine which phase corresponds to the maximum power value. And if a single piece of power and phase information is stored that corresponds to the maximum power value, the receiver can simply use that information to generate the coarse acquisition phase.

As noted above with respect to FIG. 11, the receiver may then step back the coarse acquisition phase prior to performing a fine acquisition process.

In particular, a method of receiving a wireless signal is provided, comprising: receiving an incoming signal; generating a coarse agile clock signal having a coarse agile clock phase; generating an on-time signal and an error signal corresponding to the incoming signal and the coarse agile clock signal; generating a total power signal equal to a signal corresponding to the square of the on-time signal plus a signal corresponding to the square of the error signal; advancing the coarse agile clock phase through a coarse portion of the code wheel at coarse phase intervals and repeating the generating of the total power signal at each of the coarse phase intervals; and identifying a coarse peak value for the total power signal and an associated coarse peak phase for the agile clock after advancing the agile clock phase through the entire code wheel.

The signal corresponding to the squared on-time signal may be an absolute value on-time signal, and the signal corresponding to the squared error signal may be an absolute value error signal.

The method may further comprise adjusting the coarse peak phase to account for a coarse acquisition processing delay.

The method may further comprise: generating a fine agile clock signal having a fine agile clock phase based on the coarse peak phase; generating an absolute value signal equal to an absolute value of the on-time signal; advancing the fine agile clock phase through a fine portion of the code wheel at fine phase intervals and repeating the generating of the absolute value signal at each of the fine phase intervals; identifying a fine acquisition phase based on the coarse acquisition phase and an absolute value of the on-time signal; and identifying a fine peak value for the absolute value signal and an associated fine peak phase for the agile clock after advancing the agile clock phase through the subset of the entire code wheel; and providing the fine peak phase as a current phase of the incoming signal, wherein the fine phase intervals are smaller than the coarse phase intervals, and wherein the fine portion of the code wheel is smaller than the coarse portion of the code wheel.

The method may further comprising adjusting the fine peak phase prior to providing the fine peak phase as a current phase, to account for a fine acquisition processing delay.

The operations of receiving the incoming signal, generating the coarse agile clock signal, generating the on-time signal and the error signal, generating the total power signal, advancing the coarse agile clock phase, and identifying the coarse peak value may be performed a plurality of times in parallel for a plurality of coarse portions of the code wheel.

The method may be implemented in an integrated circuit.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of receiving a wireless signal, comprising:
   receiving an incoming signal;
   generating a coarse agile clock signal having a coarse agile clock phase;
   generating an on-time signal and an error signal corresponding to the incoming signal and the coarse agile clock signal;
   generating a total power signal equal to a signal corresponding to the square of the on-time signal plus a signal corresponding to the square of the error signal;
   advancing the coarse agile clock phase through a coarse portion of the code wheel at coarse phase intervals and repeating the generating of the total power signal at each of the coarse phase intervals;
   identifying a coarse peak value for the total power signal and an associated coarse peak phase for the agile clock after advancing the agile clock phase through the entire code wheel;
   generating a fine agile clock signal having a fine agile clock phase based on the coarse peak phase;
   generating an absolute value signal equal to an absolute value of the on-time signal;
   advancing the fine agile clock phase through a fine portion of the code wheel at fine phase intervals and repeating the generating of the absolute value signal at each of the fine phase intervals;
   identifying a fine acquisition phase based on the coarse acquisition phase and the magnitude of the on-time signal; and
   identifying a fine peak value for the absolute value signal and an associated fine peak phase for the agile clock after advancing the agile clock phase through the subset of the entire code wheel; and
   providing the fine peak phase as a current phase of the incoming signal,
   wherein the fine phase intervals are smaller than the coarse phase intervals, and
   wherein the fine portion of the code wheel search is smaller than the coarse portion of the code wheel search.

2. The method of claim 1, further comprising adjusting the fine peak phase prior to providing the fine peak phase as a current phase, to account for a fine acquisition processing delay.

3. A receiver circuit, comprising:
   N receiver fingers configured to receive an incoming signal and provide N acquisition data signals, respectfully; and a controller configured to determine a phase estimate based on the N acquisition data signals and provide N control signals to the N receiver fingers, respectively, wherein each of the N receiver fingers comprises:

an agile clock configured to generate an agile clock signal having a controllable agile clock phase based on a respective one of the N control signals, a code processor configured to receive the incoming signal and the agile clock signal, and to generate an on-time signal and an error signal corresponding to the incoming signal, a coarse acquisition circuit configured to identify a coarse acquisition phase based on a total power of the on-time signal and plus a total power of the error signal, a fine acquisition circuit configured to identify a fine acquisition phase based on the coarse acquisition phase and a magnitude of the on-time signal, and an acquisition controller configured to control operation of the coarse acquisition circuit and the fine acquisition circuit, and to provide a corresponding one of the N acquisition data signals based on the one or more fine acquisition phases, wherein the N control signals instruct the agile clock in each of the N receiver fingers to operate in one of N phase ranges, respectively, each of the N phase ranges being less than an entire code wheel, and wherein the N phase ranges together cover the entire code wheel.

4. The receiver circuit of claim 3, wherein the coarse acquisition circuit in each of the N receiver fingers further comprises:

an on-time signal squaring circuit configured to square the on-time signal to generate a squared on-time signal;

an error signal squaring circuit configured to square the error signal to generate a squared error signal;

a summer configured to add the squared on-time signal and the squared error signal to generate a total power signal; and a coarse peak detector for identifying one or more coarse signal peaks in the total power signal and one or more corresponding coarse agile clock phases, wherein the corresponding coarse agile clock phase associated with a maximum of the one or more coarse signal peaks is provided as the coarse acquisition phase.

5. The receiver circuit of claim 4, wherein in each of the N receiver fingers, the coarse acquisition circuit further comprises a coarse acquisition filter for filtering the total power signal to generate a filtered coarse signal, and wherein in each of the N receiver fingers, the coarse peak detector identifies one or more coarse signal peaks in the filtered coarse signal.

6. The receiver circuit of claim 4, wherein the fine acquisition circuit in each of the N receiver fingers further comprises:

an absolute value circuit configured to determine an absolute value of the on-time signal to generate an absolute value signal; and a fine peak detector for identifying one or more fine signal peaks in the absolute value signal and one or more corresponding fine agile clock phases, wherein the corresponding fine agile clock phase associated with a maximum of the one or more fine signal peaks is provided as the fine acquisition phase.

7. The receiver circuit of claim 6, wherein in each of the N receiver fingers, the fine acquisition circuit further comprises a fine acquisition filter for filtering the absolute value of the on-time signal to generate a filtered absolute value fine signal.

\* \* \* \* \*